(12) United States Patent
Catalano et al.

(10) Patent No.: US 6,217,031 B1
(45) Date of Patent: Apr. 17, 2001

(54) SEALING ARRANGEMENT FOR A ROLLING BEARING

(75) Inventors: Denis Catalano; Franqois-Xavier Jorrot; Pierre Bourchois-Jacqurt, all of Avallon (FR)

(73) Assignee: RKS S.A. (FR)

( * ) Notice: Subject to any disclaimer, the term of this patent is extended or adjusted under 35 U.S.C. 154(b) by 0 days.

(21) Appl. No.: 09/314,002

(22) Filed: May 19, 1999

(30) Foreign Application Priority Data

May 20, 1998 (FR) .................................................. 98 06414

(51) Int. Cl.[7] .................................................. F16C 33/78
(52) U.S. Cl. ............................................ 277/549; 277/500
(58) Field of Search ..................................... 277/549, 500, 277/345, 349, 351, 353, 394, 402; 384/147, 484

(56) References Cited

U.S. PATENT DOCUMENTS

| | | |
|---|---|---|
| 2,276,225 | 3/1942 | Carter . |
| 3,203,740 | 8/1965 | Peickii et al. . |
| 3,245,735 | 4/1966 | Dusseldorf . |
| 3,594,050 | 7/1971 | Guthberg . |
| 4,605,318 | 8/1986 | Kaiser . |
| 4,991,982 * | 2/1991 | Colanzi et al. ....................... 384/486 |
| 5,067,732 * | 11/1991 | Szabo et al. ............................ 277/11 |
| 5,607,240 * | 3/1997 | Kajihara et al. ...................... 384/480 |
| 5,683,186 * | 11/1997 | Akimoto et al. ...................... 384/607 |
| 5,957,461 * | 9/1999 | Ulrich .................................... 277/569 |

FOREIGN PATENT DOCUMENTS

| | | |
|---|---|---|
| 1919431 | 4/1969 | (DE) . |
| 3435437 A1 | 9/1984 | (DE) . |
| 1383004 | 4/1966 | (FR) . |
| 1099936 | 1/1968 | (GB) . |

\* cited by examiner

*Primary Examiner*—Terry Lee Melius
*Assistant Examiner*—Fredrick Conley
(74) *Attorney, Agent, or Firm*—Smith, Gambrell & Russell, LLP

(57) ABSTRACT

Sealing arrangement for a rolling bearing exhibiting at least one row of rolling elements 7 between a first ring 1 or 2 and a second ring 2 or 1 which are concentric and radially separated from one another by an annular space 11, at least on one side of the bearing, this arrangement comprising, on the said side of the bearing, an elastic seal 18 fixed to the first ring 1 or 2 and exhibiting a first lip 19 pressing against a bearing surface situated on the second ring inside the said annular space. The said first bearing surface 20 exhibits the overall shape of a cone frustum orientated in such a way that its extension towards the aforementioned side of the bearing approaches the said first ring 1 or 2, and that the said first lip 19 is shaped in such a way that the force with which it presses against the said first bearing surface 20 increases if the pressure inside the rolling bearing increases, for example when lubricating the bearing.

20 Claims, 2 Drawing Sheets

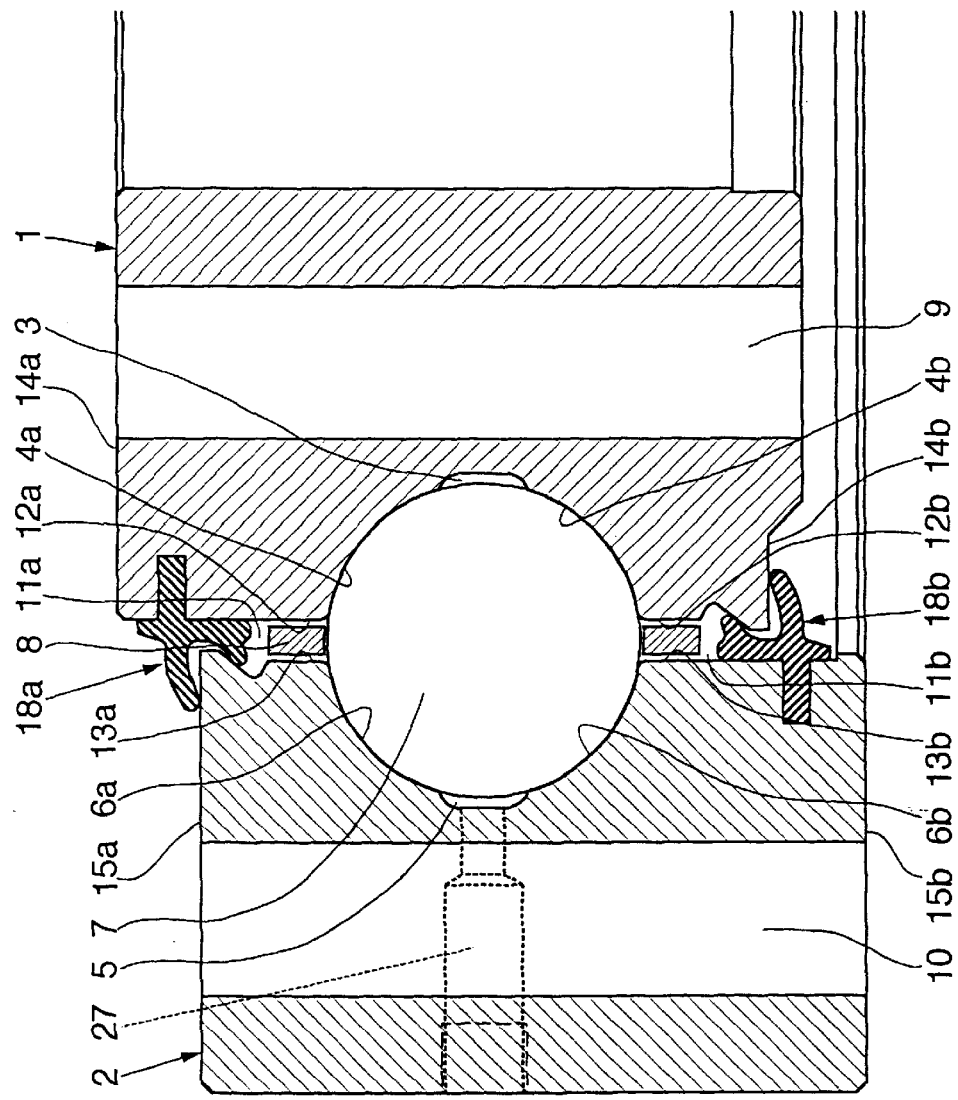

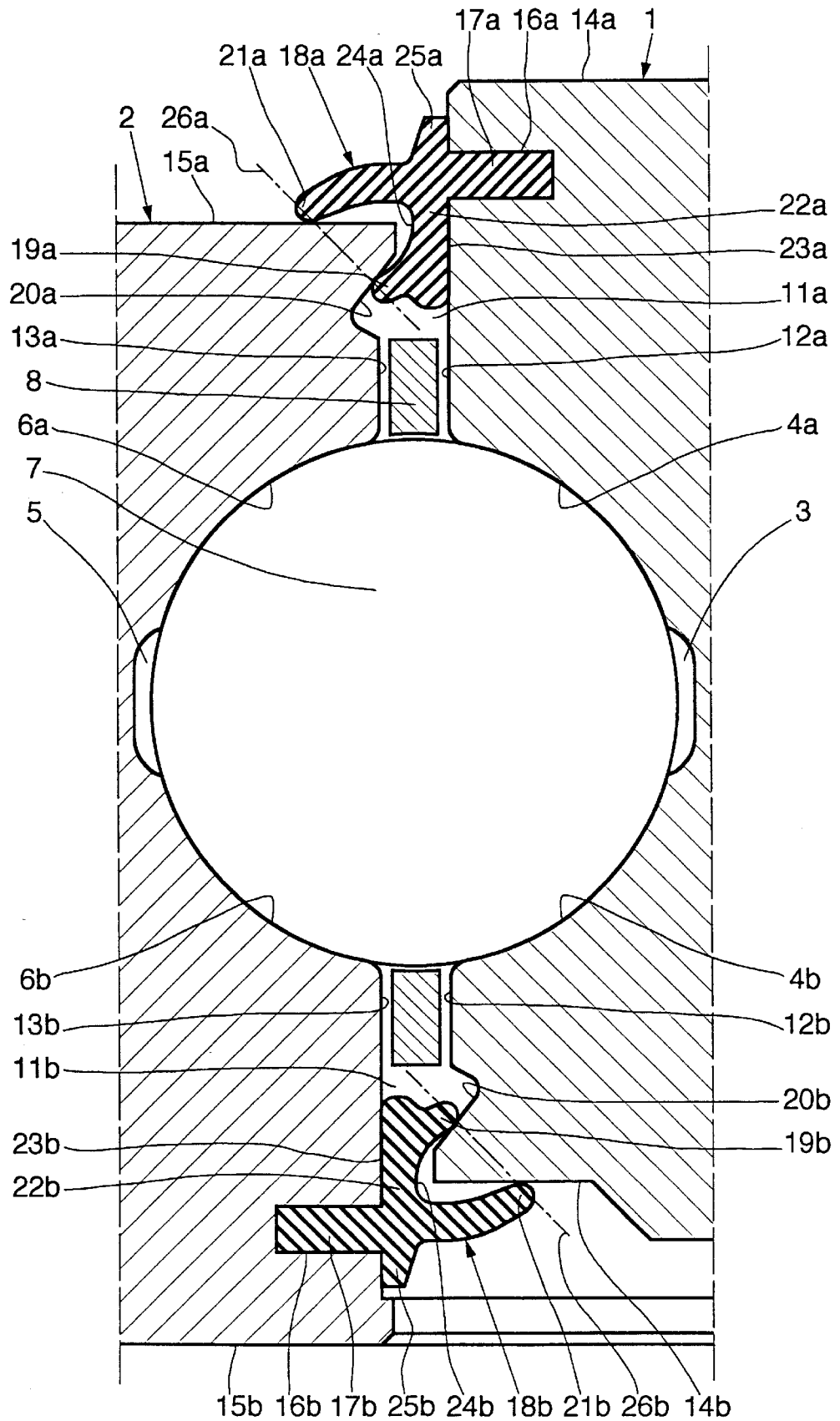

SEALING ARRANGEMENT FOR A ROLLING BEARING

The present invention relates to a sealing arrangement for a rolling bearing exhibiting at least one row of rolling elements between a first ring and a second ring which are concentric and radially separated from one another by an annular space, at least on one side of the row of rolling elements.

According to an arrangement of this type known from document DE-A-3435437, an elastic seal is fixed, on one side of the row of rolling elements, to the inner ring of the bearing, which ring is extended on this side axially beyond the outer ring. The seal is fixed by a heel engaged in a groove formed in the outer surface of the inner ring, beyond the annular space between the two rings. This known seal comprises two lips of which the first, lying in the annular space between the two rings, presses against the cylindrical inner surface of the outer ring and of which the second, lying outside the bearing, presses against the radial front surface of the outer ring. The first lip is formed at the free end of a substantially axial part of the seal which extends from the zone of attachment of the seal towards the inside of the bearing towards the row of rolling elements, pressing against the cylindrical outer surface of the inner ring, the lip itself being orientated outwards, that is to say making an angle of more than 90° with the said axial part. In this known seal, the second lip which lies outside the bearing has the function of preventing the ingress of dust, moisture and other foreign bodies into the bearing, and the first lip lying inside the rolling bearing supplements the action of the outer lip, that is to say improves the protection against the ingress of moisture and other foreign bodies into the bearing from the outside.

It is emphasized in this document that when the bearing is being lubricated, the first lip of the seal lying inside the rolling bearing allows, on account of its shape, grease to pass from inside the bearing into the space that lies between the two lips so that this space becomes filled with grease, with a view to improving the sealing effect.

Now, in the case of rolling bearings in general, but more specifically in the case of large sized rolling bearings, each time the bearing is lubricated, there is an increase in the pressure inside the bearing, under the effect of which there is a risk that the surplus grease will be ejected from the bearing at the location of the seal. In the case of large-sized rolling bearings, relief valves are provided to allow this surplus grease to be ejected. Nonetheless, the surplus grease does sometimes escape from the bearing via the seals rather than through these valves.

Now, there are numerous applications in which an escape of grease through the bearing seals must be reliably avoided, both during the lubricating of the bearings, therefore while the interior of the bearings is being pressurized, and during normal running of the bearings, during which the rings may effect relative movements, in addition to the rotational movements, under the action of the loads on the bearing.

The present invention envisages a sealing arrangement which prevents grease from escaping from the seal of a bearing, even under the effect of a raised pressure inside the bearing.

The invention furthermore envisages an arrangement which also presents the ingress of moisture, dust and other bodies into the bearing.

The sealing arrangement that is the subject of the invention is intended for a rolling bearing exhibiting at least one row of rolling bodies between a first ring and a second ring which are concentric and radially separated from one another by an annular space, at least on one side of the row of rolling elements. This arrangement comprises, on the said side of the bearing, a single elastic seal fixed to the first ring and exhibiting a first lip pressing against a bearing surface situated on the second ring inside the said annular space. The said first bearing surface exhibits the overall shape of a cone frustum orientated in such a way that its extension towards the aforementioned side of the bearing approaches the said first ring. The first lip of the seal is shaped in such a way that the force with which it presses against the said first bearing surface increases if the pressure inside the bearing increases.

In the sealing arrangement according to the invention, the said first lip, because of its particular shape and the way in which it cooperates with a specially shaped bearing surface, opposes effectively any escape of grease, not only during normal running of the bearing, but also during lubrication, that is to say when the inner space of the bearing is pressurized, and in the case of relative movements that the two rings may effect in addition to the rotational movements, under the action of the loads to which the bearing is subjected during running.

As a preference, the seal may be fixed in a way known per se to the first ring outside the annular space between the two rings and may exhibit, between its zone of attachment and the said first lip, a substantially axial part pressing against a substantially cylindrical surface of the first ring. The said first lip may therefore lie in the extension of the said axial part of the seal, making, with the said axial part, an angle of 90° at the most, preferably an angle smaller than 90°.

However, as a preference, the said axial part of the seal may exhibit a (radial) thickness which increases from the zone of attachment towards the row of rolling elements, and the maximum-thickness free end part of which directly constitutes the said first lip. The first lip is thus directly incorporated into the axial part, the two parts forming a unitary and preferably solid assembly.

In this case, the said axial part of the seal advantageously exhibits, on the side facing towards the second ring, a flank which, at least in line with the said first bearing surface makes, with the axis of the bearing, an angle of inclination that is greater than the angle of inclination of the first generally frustoconical bearing surface.

According to a preferred embodiment, the said flank of the axial part of the seal exhibits a curved profile of which the angle of inclination, with respect to the axis of the bearing, increases from the zone of attachment of the seal towards the free end of the said part, constituting the first lip.

The first bearing surface advantageously makes an angle of between about 30 and 60° and preferably an angle of the order of about 45° with the axis of the bearing.

To protect the bearing against the ingress of moisture, dust or other foreign bodies from the outside, the seal may, in a way known per se, exhibit a second lip which, lying outside the bearing, is pressed against a second substantially radial bearing surface of the second ring of the bearing. The two lips of the seal are therefore preferably dimensioned and shaped in such a way that their lines of pressing against the second ring lie on a frustoconical surface which makes, with the axis of the bearing, an angle of about 30 to 60°, preferably an angle of the order of about 45°. The two lips which act in opposite directions against their bearing surfaces lying on the same ring of the bearing, are thus able in an optimal manner to follow the relative movements that the two rings of the bearing may effect under the effect of the loads (axial, radial, tipping moments) to which the bearing may be subjected during running, without the seal losing its sealing functions.

To make the seal easier to install on the bearing, and improve its retention on the bearing, the seal may advantageously comprise, beyond its zone of attachment, that is to say, with respect to this zone, on the opposite side to the axial part bearing the first lip, an annular heel pressing against the first ring.

An illustrative and non-limiting embodiment of a sealing arrangement according to the invention for a rolling bearing will be described below in greater detail with reference to the appended drawings; in the drawings:

FIG. 1 is a half section of a bearing, comprising two sealing arrangements in accordance with the invention;

FIG. 2 is a part section on a larger scale of the rolling bearing of FIG. 1.

The rolling bearing as illustrated by FIG. 1, is a large-diameter single-row ball bearing comprising an inner ring 1 and an outer ring 2 which are concentric. The inner ring 1 defines an inner race subdivided by a groove 3 into two raceways 4a, 4b shaped as arcs of a circle. Similarly, the outer ring 2 defines an outer race subdivided by a groove 5 into two raceways 6a, 6b. The balls 7 arranged between the raceways 4a, 4b and 6a, 6b, while at the same time being kept spaced apart by a cage 8, thus have four points of contact with the rings 1 and 2.

The rings 1 and 2 comprise, in a way known per se, holes 9 and 10 for fixing the two rings to two parts of a machine, which can rotate one with respect to the other by virtue of the bearing.

The two rings 1 and 2 are separated radially from one another, on each side of the row of balls 7, by an annular space 11a, 11b in which the cage 8 rotates.

As is particularly apparent from FIG. 2, the two rings 1 and 2 are asymmetric with respect to a transverse radial plane passing through the axis of the balls 7. In this particular instance, the inner ring 1 exhibits, with respect to the said plane, an axial width which is greater towards the top than it is towards the bottom, whereas, on the other hand, the outer ring 2 exhibits, with respect to the said plane a width which is smaller towards the top than it is towards the bottom. Thus, the inner ring 1 extends axially beyond the outer ring 2 towards the top, whereas the outer ring 2 protrudes axially beyond the inner ring 1 towards the bottom. The cylindrical outer surface 12a of the inner ring 1 which delimits the space 11a above the balls 7, in combination with the cylindrical inner surface 13a of the outer ring 2 therefore has, along the axis of the bearing, a larger size than the surface 13a. Conversely, the cylindrical inner surface 13b of the outer ring 2 which, beneath the balls 7, delimits the annular space 11b in combination with the cylindrical outer surface 12b of the inner ring 1 has, along the axis of the bearing, a larger size than the surface 12b.

Bearing in mind these differences in the axial lengths of the opposed surfaces 12, 13a on the one hand, and 12b, 13b on the other hand, the front surface 15a of the outer ring 2 above the balls 7 is axially set back from the corresponding front surface 14a of the inner ring 1, whereas the front surface 14b of the inner ring 1 below the balls 7 is axially set back from the corresponding front surface 15b of the outer ring 2.

In its outer surface 12a, in a region located between its front surface 14a and the front surface 15a of the outer ring 2, the inner ring 1 has a groove 16a in which an inner heel 17a of an annular seal 18a is fixed.

The seal 18a, which is represented in the Figures as a monolithic seal formed of a common elastic material comprises a first lip 19a pressing against a first bearing surface 20a of the outer ring 2, and a second lip 21a in contact with the surface 15a of the outer ring 2.

The bearing surface 20a is formed in the inner surface 6a of the ring 2 in the form of a frustoconical surface orientated in such a way as to converge towards the top of the drawing, that is to say in such a way that its upward extension approaches the inner ring 1. In this particular instance, the frustoconical bearing surface 20a makes an angle of the order of 45° with the axis of the bearing, its outward extension passing substantially through the mouth of the groove 16a in the inner ring 1. The lip 19a is at the free end of a part 22a of the seal 18a, extending axially from the attachment heel 17a towards the inside of the bearing, its inner flank 23a pressing against the outer surface 12a of the ring 1, its outer flank 24a exhibits an outwardly curved profile, its angle of inclination with respect to the axis of the bearing increasing towards the free end of the part 22a, where the angle of inclination of the flank 24a with respect to the axis of the bearing is greater than the angle of inclination of the bearing surface 20a. The lip 19a consists of the rounded free end of the outer flank 24a of the part 22a.

The second lip 21a in contact with the radial surface 15a of the ring 2 extends radially outwards from the attachment heel 17a, curving slightly towards the surface 15a.

The seal 18a furthermore comprises an annular part 25a extending away from the part 22a, in the form of an outer heel pressing against the outer surface 12a of the inner ring 1.

It should be noted that in the embodiment depicted, the two lips 19a, 22a and 21a are shaped and dimensioned in such a way that their lines of pressing against the second ring 2 (against the bearing surfaces 20a and 15a) lie on a frustoconical surface 26a which makes an angle of the order of about 45° with the axis of the bearing.

The sealing of the bearing on the opposite side, that is to say on the lower side in the drawings, is provided by a seal 18b which is similar to the seal 10a but reversed with respect to the latter in that it is fixed by a heel 17b into a groove 16b of the inner surface 13b of the outer ring 2 and comprises an axial part 22b, the outer flank 23b of which presses against the inner surface 13b of the outer ring 2 and the inner flank 24b of which is curved in such a way that its inclination with respect to the axis of the bearing increases towards its free end constituting a first lip 19b pressing against a frustoconical bearing surface 20b formed in the outer surface 12b of the inner ring 1. The seal 10b also comprises a second lip 21b in contact with the front surface 14b of the inner ring 1, and an outer tool 25b.

By virtue of this shaping of the seals 18a, 18b, particularly of the lips and parts 19a, 22a and 19b, 22b, and the frustoconical bearing surfaces 20a and 20b, the sealing arrangements according to the invention are particularly effective at opposing any escape of grease from the inside of the bearing to the outside, any increase in pressure inside the bearing leading to an increase in the force with which the lips 19a, 19b press against the bearing surfaces 20a, 20b without the risk of the lips 19a, 19b being expelled under the effect of the raised pressures likely to occur, for example, when lubricating the bearing through the greasing holes 27 depicted in dashed line in FIG. 1, should the bearing not have grease discharge valves or should the person tasked with performing the lubrication operation not have opened the said valves.

The two seals 18a, 18b and in particular their inner lips 19a, 19b in contact with the frustoconical bearing surfaces 20a, 20b also maintain their functions in the event of relative movements of the two rings 1 and 2 under the action of the loads (axial, radial, tipping moments) to which the bearing may be subjected during running.

It should be noted that the embodiment depicted and described was given merely by way of a non-limiting indicative example and that numerous modifications and variations are possible within the scope of the invention.

Thus, the invention applies not only to single-row four-point contact ball bearings but also to other types of rolling bearing, for example, bearings with a single row of crossed rollers, or with three rows of rollers combining two thrust bearings and one radial rolling bearings, in which case at least one of the two rings could be split.

The angles of inclination of the bearing surfaces 20a, 20b against which the inner lips 19a, 19b press, could have values other than 45°, in particular could have values of between about 30° and 60°.

Each one of the inner lips 19a, 19b, instead of being formed directly by the free end of a flank 23a, 23b of the solid part 22a, 22b could just as well be shaped in such a way that it projects over or lies in the extension of the axial part 19a, 19b, making therewith an angle of 90° at the most. However, the solid part 22a, 22b, the radial thickness of which increases towards its free end directly forming the inner lip, has the advantage of optimally resisting expulsion under the effect of a raised pressure inside the bearing.

What is claimed is:

1. Sealing arrangement for use with a rolling bearing with the rolling bearing having a central axis and comprising at least one row of rolling elements between a first ring and a second ring which are concentric to one another and radially separate from one another by an annular space, with said sealing arrangement being positioned on at least a first side of the row of rolling elements, and with the second ring having a first bearing surface and a second bearing surface, with the first bearing surface being located inside the annular space and having the general shape of a cone frustum orientated such that its extension towards the first side approaches the first ring, and the second bearing surface including a substantially radial bearing surface located outside the annular space, said sealing arrangement comprising a single annular elastic seal having an attachment portion attached to the first ring when in use, and said elastic seal further including a first lip in contact with the first bearing surface and a second lip in contact with the second bearing surface when in use, and said first and second lips being shaped such that their lines of contact with respect to the second ring lie on a frustoconical surface which forms with the central axis of the rolling bearing an angle of between about 30° and 60°.

2. Arrangement according to claim 1, wherein the lines of contact with respect to the second ring lie on a frustoconical surface which forms with the central axis of the rolling bearing an angle of 45°.

3. Arrangement according to claim 1, wherein said first lip is positioned at a free end of an axially extending part of said sealing arrangement, which axially extending first part has a first flank surface positioned for contact with a cylindrical surface of the first ring when in use and a second flank surface with a curved surface which increases in curvature in going toward the free end of said axially extending part.

4. Arrangement according to claim 3, wherein said second lip is positioned at a free end of a radially extending part of said seal, wherein said radially extending part includes a curved surface which curves inwardly toward said first lip.

5. Arrangement according to claim 1, wherein said seal, when in use is attached to the first ring at a zone of attachment located outside the annular space, and an interface between said seal and the first ring is represented by a substantially cylindrical surface in the first ring between the zone of attachment and the at least one row of rolling elements, and said seal further comprises, between the zone of attachment and the first lip located inside said space, a substantially axial portion bearing against the cylindrical surface, said first lip extending from said axial portion, and making an angle of less than 90° therewith.

6. Arrangement according to claim 1, wherein said seal is dimensioned such that, when in use, said seal is attached to the first ring at a zone of attachment located outside the annular space, and an interface between said seal and the first ring comprises a substantially cylindrical surface between the zone of attachment and the least one row of rolling elements, and said seal comprises, between the zone of attachment and said first lip located inside said space, a substantially axial portion bearing against the cylindrical surface and having a radial thickness which increases from the zone of attachment towards said at least one row of rolling elements, the maximum-thickness end zone of said substantially axial portion constituting said first lip.

7. Arrangement according to claim 1, wherein said seal is dimensioned such that when in use said seal is attached to the first ring at a zone of attachment located outside the annular space, an interface between said seal and the first ring comprises a substantial cylindrical surface between the zone of attachment and the at least one row of rolling elements, and said seal comprises, between the zone of attachment and said first lip, located inside the annular space, a substantially axial portion bearing against the cylindrical surface and having, on the side facing towards the second ring, a flank which, in the region of the first bearing surface, forms with the central axis of the bearing an angle of inclination that is greater than the angle of inclination that the central axis forms with the first bearing surface.

8. Arrangement according to claim 1, wherein said seal is dimensioned such that when in use said seal is attached to the first ring at a zone of attachment located outside the annular space, and an interface between said seal and the first ring comprises a substantially cylindrical surface between the zone of attachment and the at least one row of rolling elements, and said seal comprises, between the zone of attachment and said first lip located inside the annular space, a substantially axial portion bearing against the cylindrical surface and having, on the side facing towards the second ring, a curved profile of which the angle of inclination with respect to the central axis of the rolling bearing increases from the zone of attachment towards the free end of said axial portion, said angle of inclination, in the region of the first bearing surface, being greater than the angle of inclination of the first bearing surface.

9. Arrangement according to claim 1, wherein an interface between said seal and the first ring comprises, on the one side, a substantially cylindrical surface with an annular groove therein, said seal comprises an attachment heel portion received in said groove for attachment of said seal to the first ring, a substantially axial portion extending on one side of said attachment heel portion between said attachment heel portion and said first lip and, when in use, bearing against the cylindrical surface inside the annular space between the groove and the row of rolling elements, and an annular bearing heel portion extending on the opposite side of said attachment heel portion than said axial portion and bearing against the cylindrical surface outside the annular space.

10. An arrangement as recited in claim 1, wherein said seal is a monolithic unit formed of a common elastic material.

11. A roller bearing assembly comprising a sealing arrangement in combination with a rolling bearing, with said roller bearing having a central axis and comprising at least one row of rolling elements between a first ring and a second ring which are concentric to one another and radially separate from one another by an annular space, and said sealing arrangement being positioned on at least a first side of said row of rolling elements, and said second ring having a first bearing surface and a second bearing surface, with said first bearing surface being located inside said annular space and having a general shape of a cone frustum orientated such that its extension towards said first side of said roller of rolling elements approaches said first ring, and said second bearing surface being a substantially radial bearing surface located outside said annular space, said arrangement comprising, on said first side of said row of rolling elements, a single annular elastic seal having an attachment component attached to said first ring and having a first lip and a second lip in contact with said first bearing surface and with said second bearing surface on said second ring, said first and second lips being shaped such that their lines of contact with said second ring lie on a frustoconical surface which forms with said central axis of said rolling bearing an angle of between about 30° and 60°.

12. An assembly according to claim 11, wherein the lines of contact between said first and second lips with respect to said first bearing surface form a frustoconical surface with said central axis of the rolling bearing an angle of 45°.

13. An assembly according to claim 11, wherein said seal contacts said first bearing surface which first bearing surface forms with the central axis of the rolling bearing an angle of between 30° and 60°.

14. An assembly according to claim 13, wherein said first lip contacts said first bearing surface which first bearing surface forms with the central axis of the rolling bearing an angle of about 45°.

15. An assembly according to claim 11, wherein said seal is attached to said first ring at a zone of attachment located outside said annular space, and an interface between said seal and said first ring comprises a substantially cylindrical surface between said zone of attachment and said at least one row of rolling elements, and said seal comprises, between said zone of attachment and said first lip located inside said space, a substantially axial portion bearing against the cylindrical surface, and said first lip extending from said axial portion, and making an angle of less than 90° therewith.

16. An assembly according to claim 11, wherein said seal is attached to said first ring at a zone of attachment located outside said annular space, and an interface between said seal and said first ring comprises a substantially cylindrical surface between said zone of attachment and said at least one row of rolling elements, and said seal comprises, between said zone of attachment and said first lip located inside said space, a substantially axial portion bearing against said cylindrical surface and having a radial thickness which increases from said zone of attachment towards said at least one row of rolling elements, the maximum-thickness end zone of said portion constituting said first lip.

17. An assembly according to claim 1, wherein said seal is attached to said first ring at a zone of attachment located outside said annular space, an interface between said seal and the first ring comprises a substantial cylindrical surface between said zone of attachment and said at least one row of rolling elements, and said seal comprises, between said zone of attachment and said first lip, located inside said space, a substantially axial portion bearing against said cylindrical surface and having, on the side facing towards said second ring, a flank which, in the region of said first bearing surface, forms with said central axis of said bearing an angle of inclination that is greater than the angle of inclination that the central axis forms with said first bearing surface.

18. An assembly according to claim 1, wherein said seal is attached to said first ring at a zone of attachment located outside said annular space, an interface between said seal and the said first ring comprises a substantially cylindrical surface between said zone of attachment and said at least one row of rolling elements, and said seal comprises, between said zone attachment and said first lip located inside said space, a substantially axial portion bearing against said cylindrical surface and having, on the side facing towards said second ring, a curved profile of which the angle of inclination with respect to the central axis of the rolling bearing increases from said zone of attachment towards the free end of said portion, said angle of inclination, in the region of said first bearing surface, being greater than the angle of inclination of said first bearing surface.

19. An assembly according to claim 1, wherein an interface between said seal and said first ring comprises, on said one side, a substantially cylindrical surface with an annular groove therein, said seal comprises an attachment heel portion received in said groove for attachment of said seal to said first ring, a substantially axial portion extending on one side of said attachment heel portion between said attachment heel portion and said first lip and bearing against said cylindrical surface inside said annular space between said groove and said row of rolling elements, and an annular bearing heel portion extending on the opposite side of said attachment heel portion than said axial portion and bearing against said cylindrical surface outside said annular space.

20. An assembly as recited in claim 1, wherein said seal is a monolithic unit formed of a common elastic material.

* * * * *